(12) United States Patent
Ono

(10) Patent No.: US 8,949,005 B2
(45) Date of Patent: Feb. 3, 2015

(54) CONTROL UNIT OF INTERNAL COMBUSTION ENGINE

(75) Inventor: Takahiko Ono, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 799 days.

(21) Appl. No.: 13/246,165

(22) Filed: Sep. 27, 2011

(65) Prior Publication Data

US 2012/0296558 A1  Nov. 22, 2012

(30) Foreign Application Priority Data

May 17, 2011  (JP) ................................ 2011-110273

(51) Int. Cl.

| F02D 45/00 | (2006.01) |
|---|---|
| F02D 28/00 | (2006.01) |
| G01L 23/22 | (2006.01) |
| F02P 5/152 | (2006.01) |
| F02D 35/02 | (2006.01) |
| F02D 41/28 | (2006.01) |

(52) U.S. Cl.
CPC ............. G01L 23/225 (2013.01); G01L 23/221 (2013.01); *F02D 35/027* (2013.01); G01L 23/226 (2013.01); *F02D 2041/288* (2013.01); *F02P 5/152* (2013.01); *Y02T 10/46* (2013.01)
USPC ..................... 701/111; 123/406.33

(58) Field of Classification Search
CPC ... G01L 23/221; G01L 23/226; G01L 23/225; F02D 2200/101; F02D 2041/288; F02D 35/027

USPC ........ 701/111, 101, 102; 123/406.11, 406.16, 123/406.21, 406.29, 406.33, 406.37, 123/406.42; 73/35.01, 35.09
See application file for complete search history.

(56) References Cited

U.S. PATENT DOCUMENTS

| 5,267,164 A * | 11/1993 | Miyama ......................... 701/111 |
| 7,963,269 B2 * | 6/2011 | Kaneko et al. ................. 701/111 |
| 2014/0041439 A1 * | 2/2014 | Matsushima ................. 73/35.09 |

FOREIGN PATENT DOCUMENTS

| JP | 2006-207491 A | 8/2006 |
| JP | 2006-307709 A | 11/2006 |

* cited by examiner

*Primary Examiner* — Hieu T Vo
(74) *Attorney, Agent, or Firm* — Sughrue Mion, PLLC; Richard C. Turner

(57) ABSTRACT

A peak signal extracting device extracts a first peak value, being the maximum value of vibration level of a specified frequency in a predetermined crank angle range, and a crank angle; noise level storage device stores a noise vibration level; noise occurrence timing estimation device estimates a crank angle at which noise vibration peak takes place; and noise removing device calculates a second peak value based on the first peak value when a crank angle at which first peak value takes place and a crank angle at which noise peak value estimated to take place are not in coincidence, and calculates a second peak value based on the first peak value and noise peak value when the crank angles are identical. Even if the knocking vibration peak and noise vibration peak are overlapped, presence or absence of occurrence of knocking is determined precisely and a knocking strength is calculated properly.

12 Claims, 12 Drawing Sheets

WHEN KNOCKING HAS NOT OCCURRED YET
(NOISE SOURCE IS ABSENT)

(a)

WHEN KNOCKING HAS OCCURRED
(NOISE SOURCE IS ABSENT)

(b)

WHEN KNOCKING HAS NOT OCCURRED YET
(NOISE SOURCE IS PRESENT,
NOISE REMOVAL IS PERFORMED)

(a)

WHEN KNOCKING HAS OCCURRED
(NOISE SOURCE IS PRESENT,
NOISE REMOVAL IS PERFORMED)

(b)

WHEN KNOCKING HAS NOT OCCURRED YET
(NOISE SOURCE IS PRESENT,
NOISE REMOVAL IS PERFORMED)

(a)

WHEN KNOCKING HAS OCCURRED
(NOISE SOURCE IS PRESENT,
NOISE REMOVAL IS PERFORMED)

(b)

CONTROL UNIT OF INTERNAL COMBUSTION ENGINE

BACKGROUND OF THE INVENTION

1. Field of the Invention

The present invention relates to a control unit having the function of suppressing knocking to occur in an internal combustion engine and, more specifically, to a control unit of an internal combustion engine achieving the precision improvement in knocking detection by removing a "noise to take place due to operation of an operating member such as fuel injection valve, intake valve or exhaust valve" that is superimposed on a "vibration waveform that is detected using a knocking sensor".

2. Description of the Related Art

Conventionally, adopted is a control unit of an internal combustion engine having such a knocking suppression function as "to suppress the occurrence of knocking by detecting the vibration in a cylinder to take place due to abnormal combustion of an internal combustion engine using a knocking sensor to correct an ignition timing to the retard side, thereby suppressing the occurrence of knocking."

In such a control unit of an internal combustion engine having such a knocking suppression function, first with respect to a vibration waveform of the internal combustion engine having been detected by a knocking sensor, an operation such as Discrete Fourier Transform (DFT: Discrete Fourier Transform) is performed to extract only the vibration component of a specified frequency.

This specified frequency is a frequency with which a vibration level due to occurrence of knocking can be detected with high sensitivity, and has preliminarily been selected.

Next, a peak value pkl in a predetermined crank angle range of the vibration component of the mentioned specified frequency is extracted.

Furthermore, a background level bgl corresponding to the average value of the peak value pkl is calculated by filtering the peak value pkl.

Incidentally, the mentioned predetermined crank angle range has preliminarily been set as the "range of a crank angle at which a vibration level due to occurrence of knocking can be detected with high sensitivity", and is generally referred to as a knocking detection period.

Besides, a standard deviation sgm is calculated based on the peak value pkl and background level bgl, and a threshold thd for knocking determination is calculated based on the background bgl and standard deviation sgm by the equation of "thd=bgl+(K1×sgm)".

Where, K1 is a predetermined coefficient for calculating a threshold thd for knocking determination.

When a threshold thd for knocking determination is calculated, subsequently, by the comparison between the peak value pkl and the threshold thd for knocking determination, the presence or absence of the occurrence of knocking is determined.

In the case of pkl≤thd, no occurrence of knocking is determined, and a knocking strength knk, being the magnitude of a vibration level due to occurrence of knocking is set to zero.

On the contrary, in the case of "pkl>thd", an occurrence of knocking is determined, and a knocking strength knk is calculated by the equation of "knk=(pkl−thd)/bgl".

Furthermore, based on the value of the knocking strength knk, a knocking retard amount rtd is calculated by the equation of "rtd=knk×K2", and an ignition timing is changed to the retard side (that is, the side of delaying an ignition timing) by the knocking retard amount rtd.

Where, K2 is a predetermined coefficient for converting a knocking strength knk to a knocking retard amount rtd.

By the above-described series of processing, when the occurrence of knocking is determined based on the vibration waveform of the internal combustion engine to be detected by a knocking sensor, the ignition timing is corrected to the lag side in accordance with the magnitude of vibration level by the knocking, thus suppressing the occurrence of knocking.

However, depending on the operation state of the internal combustion engine, regardless of the presence or absence of the occurrence of knocking, a noise vibration to take place by the operation of any electric or mechanical operating member (for example, fuel injection valve, intake valve or exhaust valve) provided at an internal combustion engine may be superimposed on the vibration waveform detected by the knocking sensor in some cases.

In such cases, the knocking sensor may detect these noise vibrations to erroneously determine the occurrence of knocking, or may calculate a knocking strength with including a noise vibration even if the occurrence of knocking can be correctly determined.

Therefore, a problem exits in the "calculation of a knocking retard amount comes to be incorrect, and the output reduction or uncomfortable output change of the internal combustion engine arises."

Accordingly, in the Japanese Patent Publication (unexamined) No. 207491/2006 or the Japanese Patent Publication (unexamined) No. 307709/2006, proposed is a method of removing noises that may superimpose on a vibration waveform a knocking sensor detects, thus to achieve precision improvements in knocking detection.

In the Japanese Patent Publication (unexamined) No. 207491/2006, proposed is a method in which the occurrence period of noise vibration is estimated based on the timing of driving a fuel injection valve, being one of noise sources, and in the case that the occurrence period of noise vibration is superimposed on the knocking detection period, the occurrence period of noise vibration in the knocking detection period is masked.

Thus, even in the case that a noise vibration takes place in the knocking detection period, the erroneous determination of knocking due to superimposition of noise vibration is prevented.

In the Japanese Patent Publication (unexamined) No. 307709/2006, proposed is a method in which the form of a noise vibration to take place by the operation of an intake valve, being one of noise sources, has preliminarily been stored; pattern matching between a vibration waveform having been detected in a knocking detection period and the form of noise vibration having preliminarily been stored is made to specify the occurrence period of noise vibration; and of the vibration waveforms having been detected in the knocking detection period, the vibration level due to the occurrence of noise is subtracted from the vibration waveform of the occurrence period of noise vibration having been specified (that is, a noise vibration component is removed from a vibration waveform having been detected in the knocking detection period).

In this manner, even in the case that any noise vibration takes place in the knocking detection period, the "erroneous determination of knocking" due to superimposition of noise vibration is prevented.

However, by the method described in the Japanese Patent Publication (unexamined) No. 207491/2006, the vibration waveform in the occurrence period of noise vibration of the knocking detection period comes to be masked.

Therefore, a problem exists in that in the case that the vibration waveform to take place due to occurrence of knocking and the occurrence period of noise vibration are overlapped in the same timing, the vibration waveform to take place due to the occurrence of knocking is masked as well and thus knocking cannot be detected.

Furthermore, by the method described in the Japanese Patent Publication (unexamined) No. 307709/2006, the vibration waveform having been detected and the form of noise vibration are brought in pattern matching to specify the occurrence period of noise vibration.

Therefore, another problem exists in that in the case that the vibration waveform to take place due to the occurrence of knocking and the occurrence period of noise vibration are overlapped in the same timing, the specification of noise vibration by the pattern matching of waveform becomes difficult, resulting in the erroneous determination of knocking, or even if the occurrence of knocking is correctly determined, a knocking strength with including a noise vibration will be calculated.

SUMMARY OF THE INVENTION

The present invention was made to solve such problems, and has an object of providing a control unit of an internal combustion engine by which even in the case that a "noise vibration to take place due to operation of an operating member such as fuel injection valve, intake valve or exhaust valve" is superimposed in a knocking detection period, the vibration level due to occurrence of a noise is properly removed, and thus the presence or absence of the occurrence of knocking is determined with high precision as well as an appropriate knocking strength can be calculated at all times.

A control unit of an internal combustion engine according to the invention includes: a knocking sensor detecting a vibration waveform of an internal combustion engine; a crank angle sensor detecting a crank angle of the mentioned internal combustion engine; specified frequency extracting means extracting a vibration level of a specified frequency from a vibration waveform of the mentioned internal combustion engine; peak signal extracting means extracting a first peak value, being the maximum value of the vibration level of the mentioned specified frequency in a predetermined crank angle range, and a crank angle at which the mentioned first peak value takes place; noise level storage means in which stored is a vibration level of a noise to take place on the mentioned specified frequency due to operation of an electric or mechanical operating member that is provided in the internal combustion engine; noise occurrence timing estimation means estimating a crank angle at which a noise peak value, being a peak value of the mentioned noise vibration, takes place, based on an operation timing of the mentioned operating member; noise removing means calculating a second peak value based on the mentioned first peak value in the case that a crank angle at which the mentioned first peak value takes place and a crank angle at which the mentioned noise peak value is estimated to take place are not in coincidence, and calculating the second peak value based on the mentioned first peak value and the mentioned noise peak value in the case that a crank angle at which the mentioned first peak value takes place and a crank angle at which the mentioned noise peak value is estimated to take place are identical; BGL calculation means calculating a background level (BGL), being the average of the mentioned second peak value; threshold calculation means calculating a threshold for knocking determination based on the mentioned second peak value and the mentioned background level; knocking determination means determining the presence or absence of the occurrence of a knocking based on the mentioned second peak value and the mentioned threshold for knocking determination; knocking strength calculation means calculating a knocking strength based on the mentioned second peak value, the mentioned threshold for knocking determination and the mentioned background level when the occurrence of a knocking is determined by the mentioned knocking determination means; retard amount calculation means calculating a knocking retard amount of an ignition timing based on the knocking strength having been calculated by the mentioned knocking strength calculation means; and ignition timing correction means correcting an ignition timing based on the knocking retard amount having been calculated by the mentioned retard amount calculation means.

According to the invention, even in the case that the peak value of vibration to take place due to occurrence of knocking and a peak value of noise vibration to take place by the operation of an operating member (for example, a fuel injection valve, an intake valve and an exhaust valve) provided at the internal combustion engine are overlapped in the same timing, the vibration level of noise due to operation of the operating member is properly removed, and thus the presence or absence of the occurrence of knocking is determined with high precision as well as an appropriate knocking strength can be calculated at all times.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiment 1

A preferred embodiment as to a control unit of an internal combustion engine according to the present invention is hereinafter described with reference to the drawings.

Figure 1:
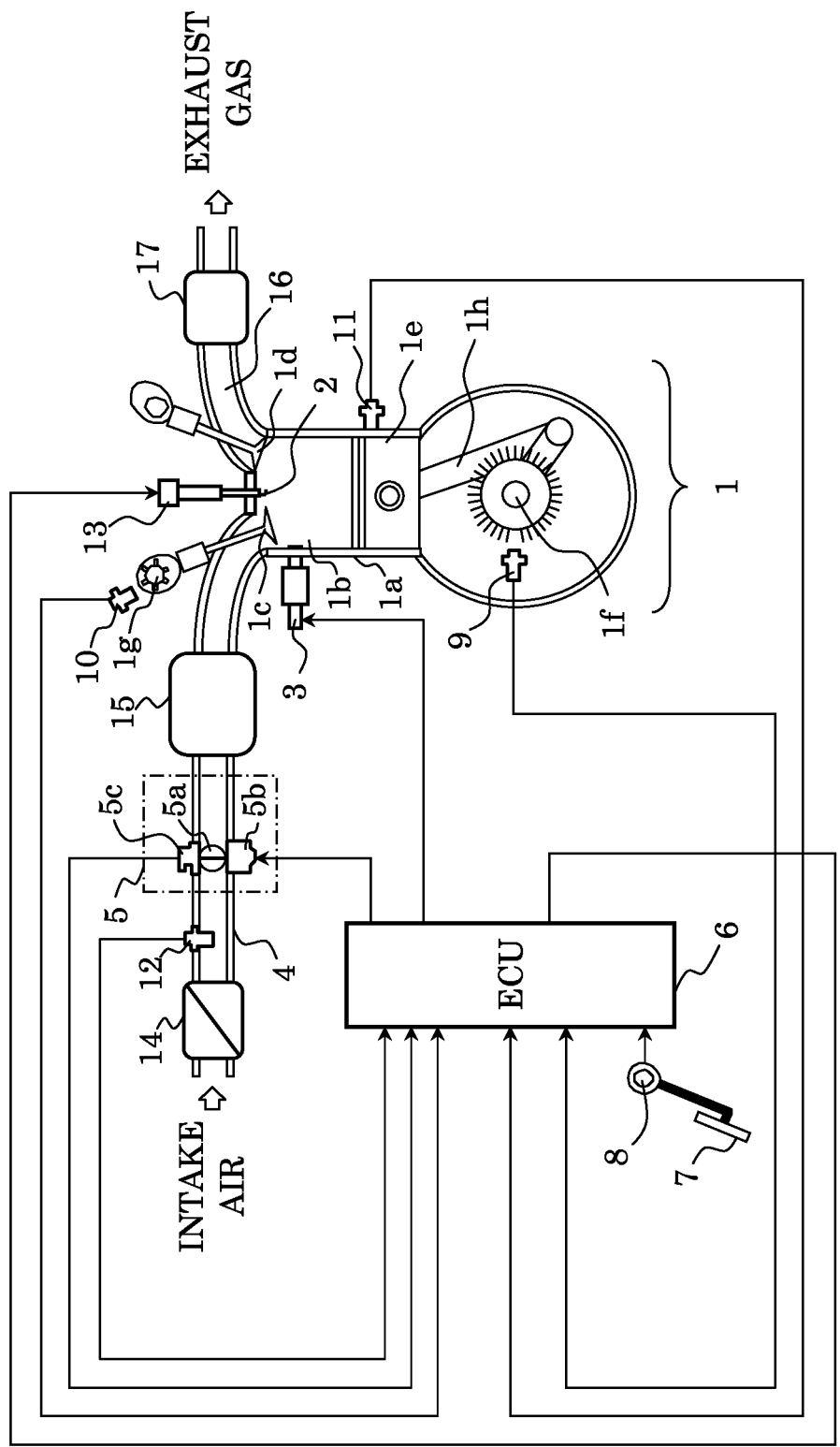
FIG. 1 is a diagram illustrating an entire construction of an internal combustion engine and its control unit according to the present invention.

FIG. 1 is a diagram illustrating an entire construction of an internal combustion engine and its control unit according to the invention.

Referring to FIG. 1, a combustion chamber 1b of a cylinder 1a of an engine 1, being an internal combustion engine an intake valve 1c, is provided with an exhaust valve 1d and a piston 1e, and further provided with an ignition plug 2 and a fuel injection valve 3 so as to face the combustion chamber 1b.

In addition, the amount of intake air to the engine 1 is adjusted by an electronic control throttle 5 that is located at an intake pipe 4. The electronic control throttle 5 is formed of a throttle valve 5a, a motor 5b acting to drive this throttle valve 5a and a throttle opening sensor 5c acting to detect the opening of the throttle valve 5c.

An engine control unit (hereinafter, referred to as an ECU) 6 obtains an output signal from an accelerator position sensor 8 acting to detect the amount of operation of an accelerator pedal 7, sends a control signal to the motor 5b and controls properly the opening of the throttle valve 5a based on a throttle valve opening signal from the throttle opening sensor 5c.

The ECU 6 obtains an output signal from the accelerator position sensor 8, a crank angle sensor 9, a cam angle sensor 10, a knocking sensor 11 and an air flow sensor 12, and various other sensors (not illustrated) and determines ignition timing, fuel injection amount and the like.

Then, based on respective determined values of these sensors, the ECU 6 drives the fuel injection valve 3 to inject and supply a fuel into the combustion chamber 1b, and drives an ignition coil 13 that is connected to the ignition plug 2, thereby causing sparks to discharge from a plug gap of the ignition plug 2.

The flow of intake air from which dust or dirt have been removed using an air cleaner 14 is measured by the air flow sensor 12, and thereafter, this intake air passes through the electronic control throttle 5 to be guided to a surge tank 15 and further passes through the intake valve 1c from the surge tank 15 to be guided into the combustion chamber 1b.

The intake air having been guided into the combustion chamber 1b and the fuel having been injected from the fuel injection valve 3 are mixed to produce a fuel-air mixture, and the air-fuel mixture is ignited by the spark discharge of the ignition plug 2 to burn.

The combustion pressure of a fuel-air mixture is transmitted to the piston 1e to cause the piston 1e to reciprocate. The reciprocating movement of the piston 1e is transmitted to a crank shaft 1f via a connecting rod 1h, converted to a rotation movement through the crank shaft 1f, and taken as output from the engine 1. The fuel-air mixture after the combustion comes to be an exhaust gas, which is discharged to an exhaust manifold 16 through the exhaust valve 1d, purified using a catalyst 17, and thereafter exhausted to the atmosphere.

Now, the outline of a knocking suppression function to be executed in the ECU 6 is described.

Figure 2:
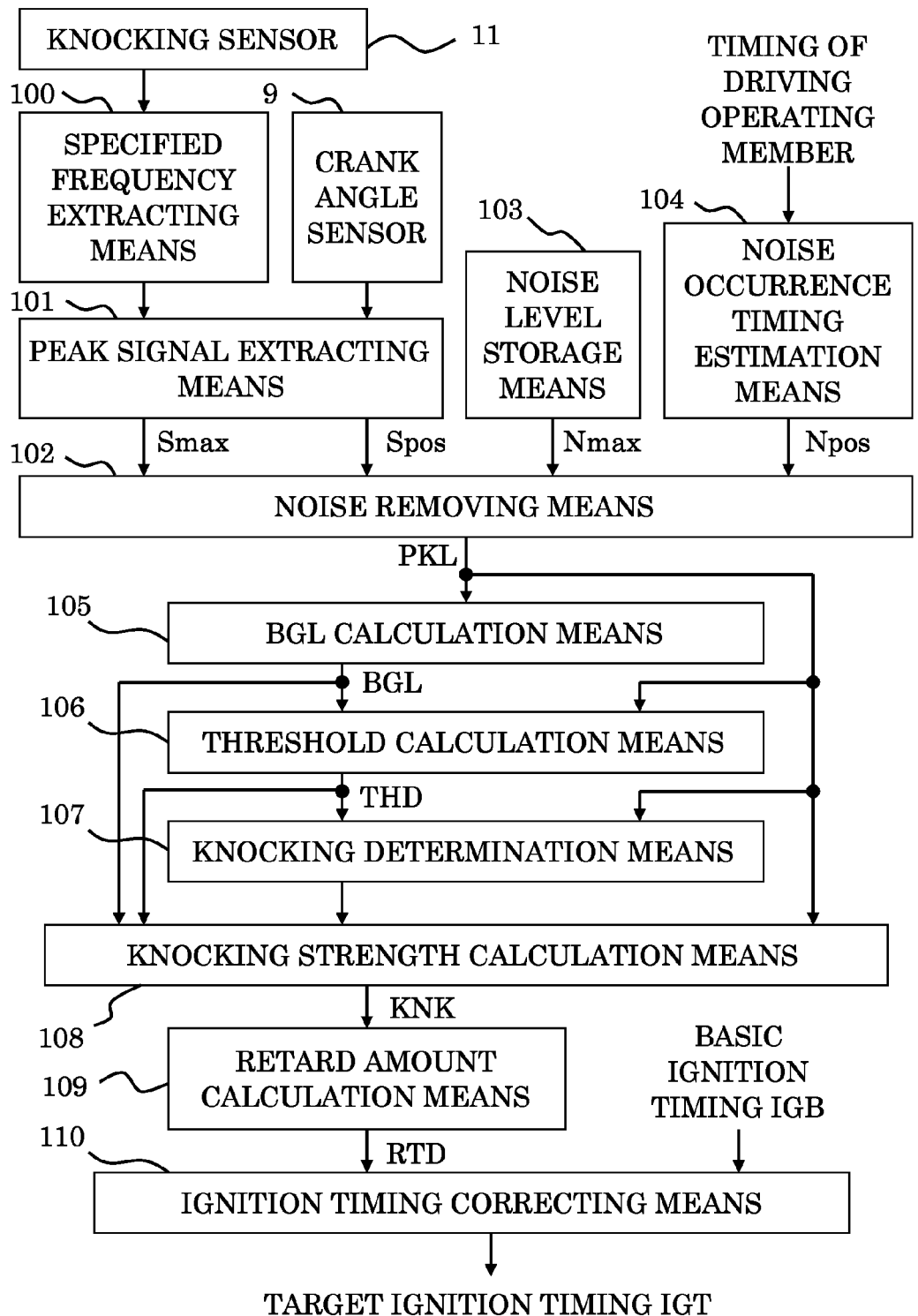
FIG. 2 is a block diagram illustrating a function arrangement of a control unit of the internal combustion engine according to a first preferred embodiment.

FIG. 2 is a block diagram showing the arrangement for executing the knocking suppression function in the control unit of the internal combustion engine according to the first embodiment.

Referring to FIG. 2, an output signal from a knocking sensor 11 having been inputted to the ECU 6 is converted from an analog signal to a digital signal by an A/D convertor (not illustrated) to be inputted to specified frequency extracting means 100.

At the specified frequency extracting means 100, the operation processing that is referred to as, for example, a Discrete Fourier Transform (DFT) is performed with respect to the output signal from the knocking sensor 11 having been digitized, and the spectrum of a specified frequency component is extracted.

Incidentally, the specified frequency is to be a frequency with which the vibration level due to occurrence of knocking can be detected with high sensitivity (in general, frequencies in the vicinity of 5 kHz to 15 kHz), and which has preliminarily been selected by, e.g., experiment.

Subsequently, at the peak signal extracting means 101, the spectrum of a specified frequency component having been extracted by the specified frequency extracting means 100 and the crank angle to be detected by the crank angle sensor 9 are sequentially stored in a buffer (not illustrated) as time series data. Furthermore, the maximum value of a spectrum having been observed in the range of a crank angle in the knocking detection period having preliminarily been set and the crank angle at this time are extracted respectively as a "first peak value Smax" and a "crank angle Spos at which the first peak value Smax takes place".

Incidentally, the mentioned knocking detection period is the one having preliminarily been set by, e.g., experiment as range of crank angle at which the vibration level resulted from knocking can be detected with high sensitivity, and is generally set to the range of crank angle in the vicinity of 60 [deg] from a compression top death center TDC (Top Death Center: the upper most position of a piston in a cylinder) to ATDC (After Top Death Center).

To noise removing means 102, in addition to the first peak value Smax that have been extracted at the peak signal extracting means 101 and the crank angle Spos at which the first peak value Smax takes place, a "noise peak value Nmax that is stored in noise level storage means 103" described later and a "crank angle Npos at which the noise peak value Nmax having been estimated at noise occurrence timing estimation means 104 is estimated to take place" described later are inputted.

Then, a comparison between the crank angle Spos at which the first peak value Smax takes place and the crank angle Npos at which the noise peak value Nmax is estimated to take place is made.

Here, in the case that Spos and Npos are not in coincidence (that is, Spos Npos), the first peak value Smax is employed as a second peak value PKL by the below-mentioned equation (1).

On the contrary, in the case that Spos and Npos are in coincidence (that is, Spos=Npos), the value that is obtained by subtracting the noise peak value Nmax from the first peak value Smax is employed as the second peak value PKL.

$$PKL = Smax \quad \text{equation (1)}$$

$$PKL = Smax - Nmax \quad \text{equation (2)}$$

In noise level storage means 103, "distribution information of a vibration level" such as generation width or magnitude of the spectrum of noise vibration to take place at the vibration level of a specified frequency is stored. Noise level storage means 103 outputs a "noise peak value Nmax", being the maximum value of the spectrum of noise vibration to the noise removing means 102.

To the noise occurrence timing estimation means 104, a crank angle of the operation timing of the operating members of the engine 1 such as fuel injection valve 3, intake valve 1c or exhaust valve 1d to be a noise source is inputted.

Incidentally, as the operation timing of these operating members to be a noise source, a control value that is operated by the ECU 6 or a detected value by a variety of sensors to be inputted to the ECU 6 is employed.

Furthermore, based on the "operation timing of the operating members to be a noise source" and a "delay time that is set in consideration of a transmission delay from this operation timing to the actual occurrence of a noise vibration as the vibration spectrum of a specified frequency", the crank angle Npos at which the noise peak value Nmax is supposed to take pace is estimated, and the crank angle Npos having been estimated is outputted to the noise removing means 102.

At BGL (background level) calculation means 105, by the below-mentioned equation (3), the second peak value PKL, being a final peak value, is filtered, and a background level BGL corresponding to the average value of the second peak value PKL is calculated. Where, k0 is a filter coefficient for calculating BGL.

$$BGL = K0 \times \text{the last operation value of } BGL + (1-K0) \times PKL \quad \text{equation (3)}$$

At threshold calculation means 106, a standard deviation SGM is obtained based on the second peak value PKL and the BGL, and by the below-mentioned equation (4), a threshold THD for knocking determination is calculated.

Where, K1 is a predetermined coefficient for calculating a threshold THD for knocking determination.

$$THD = BGL \times (K1 \times SGM) \quad \text{equation (4)}$$

At knocking determination means 107, a comparison between the second peak value PKL and a threshold THD for knocking determination is made, and the presence or absence of the occurrence of knocking is determined.

Here, while the occurrence of knocking is determined in the case of PKL>THD, no occurrence of knocking is determined in the case of PKL≤THD.

At knocking strength calculation means 108, based on the determination result of knocking determination means 107, at the time of the occurrence of knocking (PKL>THD), a knocking strength KNK is calculated by the below-mentioned equation (5), whereas at the time of no occurrence of knocking (PKL≤THD), the knocking strength KNK is set to zero by the below-mentioned equation (6).

$$KNK = (PKL - THD)/BGL \quad \text{equation (5)}$$

$$KNK = 0 \quad \text{equation (6)}$$

At retard amount calculation means 109, based on the knocking strength KNK, a knocking retard amount RTD is calculated by the below-mentioned equation (7). Where, K2 is a predetermined coefficient for converting the knocking strength KNK to a knocking retard amount RTD.

$$RTD = KNK \times K2 \quad \text{equation (7)}$$

At ignition timing correction means 110, a basic ignition timing IGB that is determined based on the operation state of the engine 1, by the below-mentioned equation (8), is changed to the lag side just by a knocking retard amount RTD, thus a final ignition timing IGT is determined. Incidentally, when no knocking comes to occur, since KNK becomes zero and RTD becomes zero as well, the final ignition timing IGT is retuned to the basic ignition timing IGB.

$$IGT = IGB - RTD \quad \text{equation (8)}$$

By a series of processing having been described above, even in the case that a peak value Smax of the vibration to take place due to occurrence of knocking and a peak value Nmax of a noise vibration are overlapped at the same timing, by the above-described equation (2), the noise peak value Nmax is removed, and thus the presence of absence of the occurrence of knocking can be determined with high accuracy as well as a proper knocking strength can be calculated at all times.

Incidentally, the above-described equations are merely examples for describing the operation of the first embodiment, and not by way of limitation.

Now, supplementary descriptions of the calculation process of a knocking strength in the case that no noise vibration is superimposed in a knocking detection period are hereinafter made with reference to timing charts of FIGS. 3 and 4.

Figure 3:
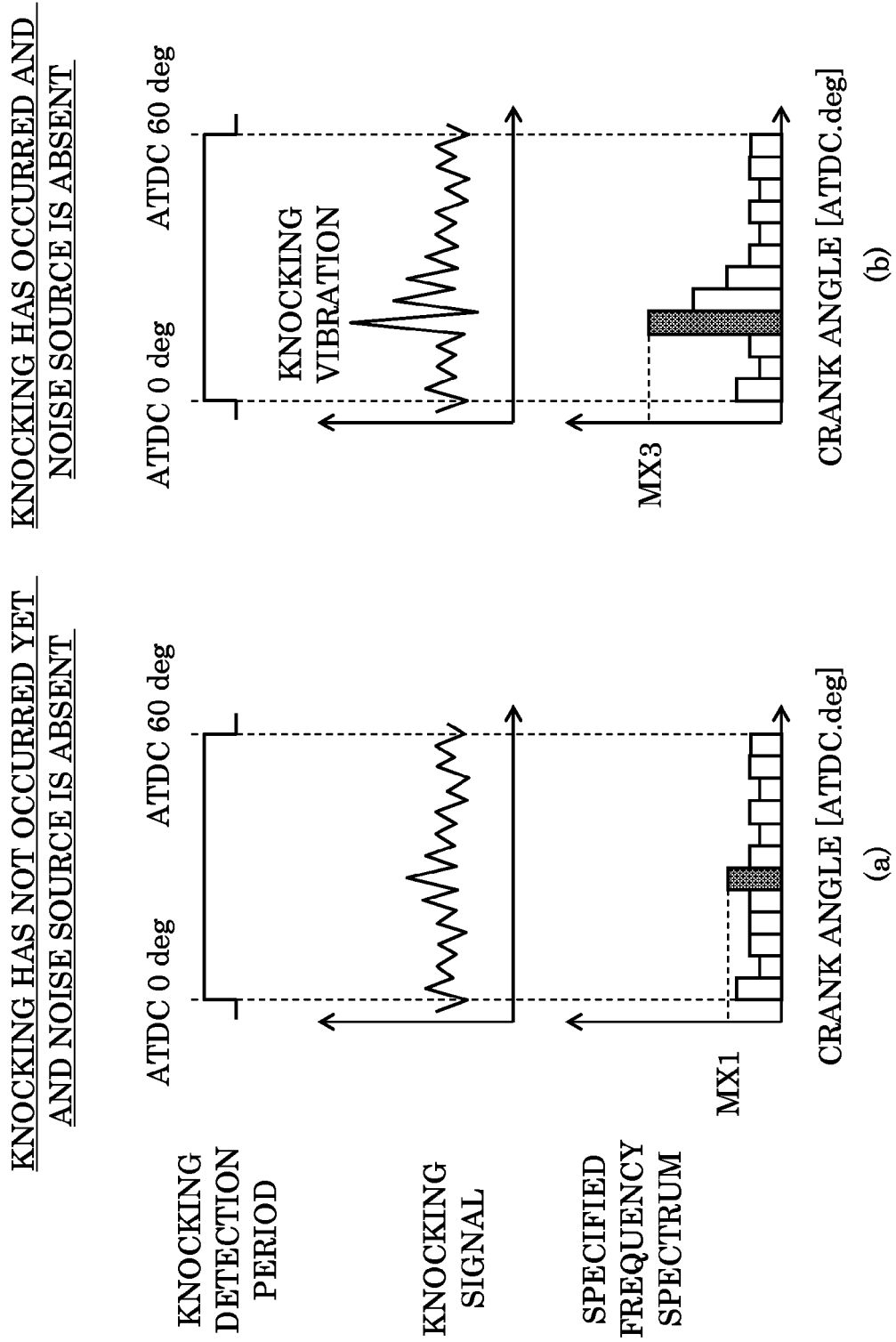
FIG. 3 is timing charts each illustrating a knocking signal and the vibration level of a specified frequency in one combustion cycle (where no noise vibration is superimposed in a knocking detection period).

FIG. 3 is timing charts each illustrating a "knocking signal and the vibration level of a specified frequency in one combustion cycle" in the case that no noise vibration is superimposed in a knocking detection period. Incidentally, FIG. 3 (a) shows one example of a knocking signal and the vibration level (spectrum) of a specified frequency with respect to a crank angle at the time when "knocking has not occurred yet as well as a noise source is absent". FIG. 3 (b) shows one example of a knocking signal and the vibration level of a specified frequency with respect to a crank angle when "knocking has occurred as well as a noise source is absent".

Figure 4:
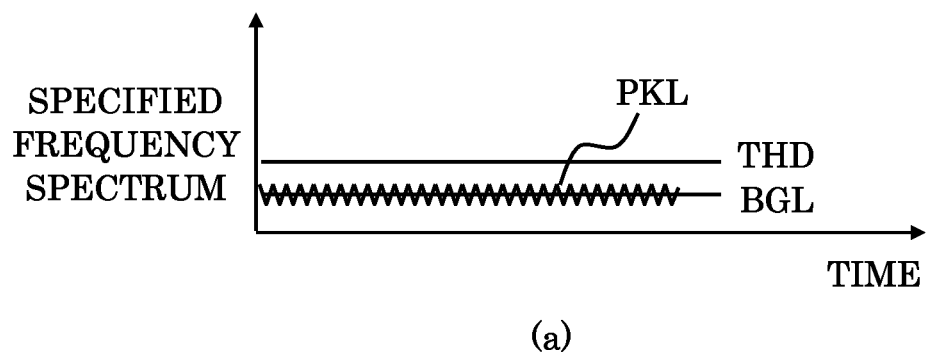
FIG. 4 is timing charts each illustrating a vibration spectrum of a specified frequency in the case where no noise is superimposed.
Figure 4:
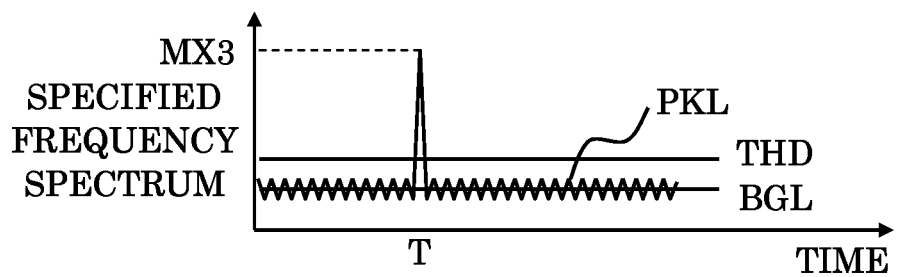

Further, FIG. 4 is timing charts each illustrating the vibration level (spectrum) of a specified frequency.

Incidentally, FIG. 4(a) illustrates the "second peak value PKL", a "background level BGL" and a "threshold THD for knocking determination" when "knocking has not occurred yet as well as a noise source is absent" as a time series example in plural cycle periods. FIG. 4 (b) illustrates the "second peak value PKL", a "background level BGL" and a "threshold THD for knocking determination" when "knocking has occurred as well as a noise source is absent" as a time series example in plural cycle periods.

Referring to FIG. 3 (a), in the case of no occurrence of knocking, with respect to a knocking signal having been detected by the knocking sensor 11, a knocking signal having been detected in a knocking detection period in one combustion cycle (it is assumed to be ATDC 0 [deg] to ATDC 60 [deg].) is brought in DFT processing and the spectrum of a specified frequency is calculated.

Thus, MX1, being the maximum spectrum in a knocking detection period (the sixth spectrum from the left in FIG. 3(a)) is selected as the first peak value Smax. Incidentally, in FIG. 3, since a noise vibration is not superimposed in the knocking detection period, the MX1 having been selected as the first peak value Smax is used as the second peak value PKL as it is.

The one that represents the second peak value PKL having been employed in each combustion cycle throughout plural cycle periods is the second peak value PKL illustrated in FIG. 4(a). Furthermore, based on this second peak value PKL, by the above-described equation (3), a background level BGL illustrated in FIG. 4(a) is calculated, and based on the second peak value PKL and the background level BGL, by the above-described equation (4), a threshold THD for knocking determination illustrated in FIG. 4(a) is calculated.

Incidentally, in FIGS. 3(a) and 4(a), since they are in the state of no occurrence of knocking, the second peak value PKL does not exceed the threshold THD for knocking determination and, by the above-described equation (6), a knocking strength KNK is set to zero.

Next, in the case of the occurrence of knocking at a certain time point T, in the knocking signal, a knocking vibration as illustrated in FIG. 3 (b) takes place, and also as to the spectrum of a specified frequency, a large spectrum (the fourth spectrum from the left in FIG. 3(b)) MX3 due to knocking vibration is calculated and this spectrum is selected as the first peak value Smax. Incidentally, since no noise vibration is superimposed in the knocking detection period, the MX3 having been selected as the first peak value Smax is employed as the second peak value PKL as it is.

Moreover, FIG. 4(b), in the same manner as in the above-described FIG. 4(a), illustrates the second peak value PKL, a background level BGL and a threshold THD for knocking determination that are shown throughout plural cycle periods. At the time point at which the second peak value PKL at a time point T when knocking has occurred exceeds the threshold THD for knocking determination, the occurrence of knocking is determined, and by the equation (5), a knocking strength KNK is calculated.

Now, supplementary descriptions of the calculation process of a knocking strength in the case that a noise vibration is superimposed in a knocking detection period are hereinafter made with reference to timing charts of FIGS. 5 and 6.

Figure 5:
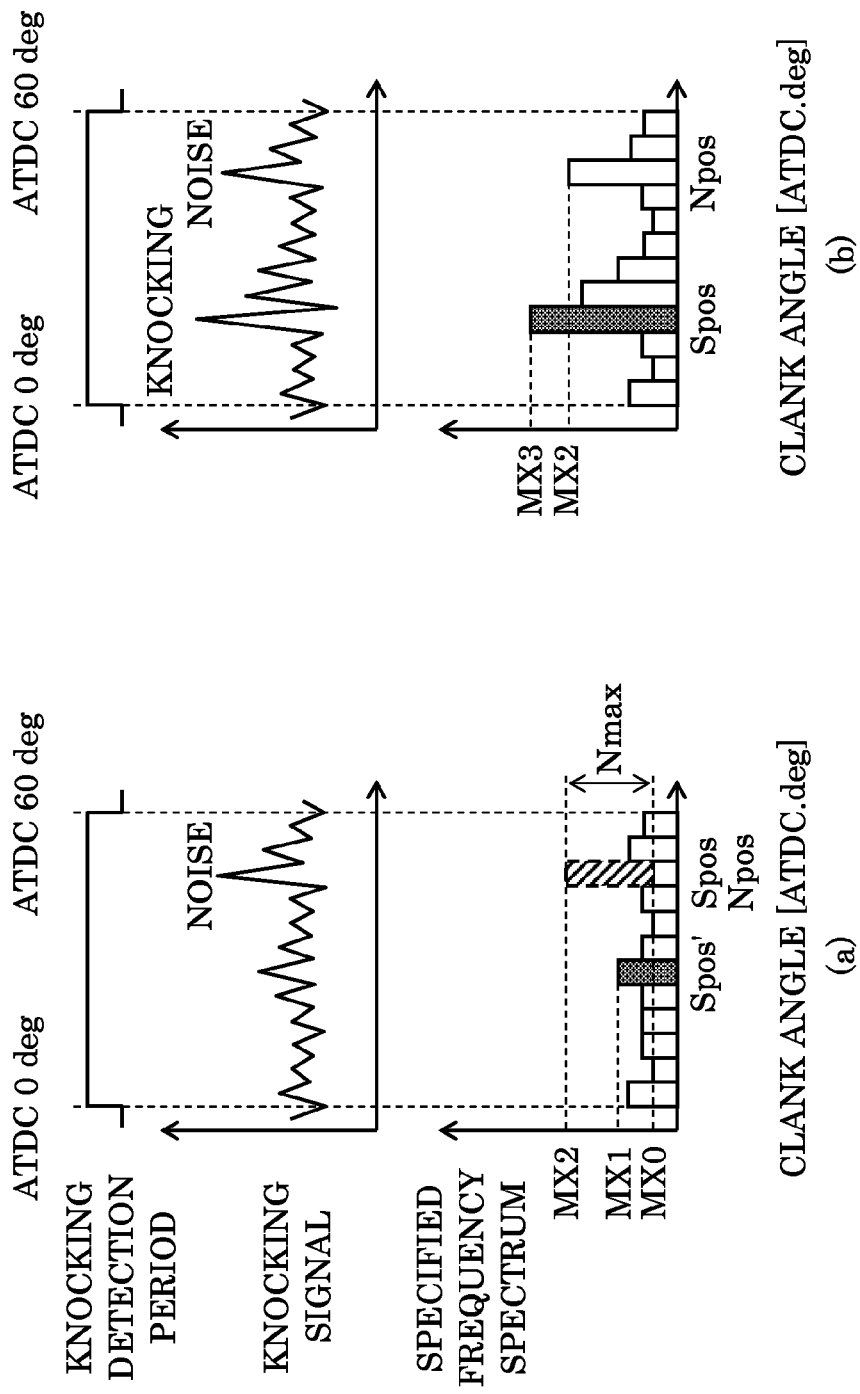
FIG. 5 is timing charts each illustrating a knocking signal and the vibration level of a specified frequency in one combustion cycle (where a noise vibration is superimposed in a knocking detection period as well as a knocking vibration and a noise vibration are not overlapped).

FIG. 5 is timing charts each illustrating a "knocking signal and the vibration level of a specified frequency in one combustion cycle" in the case that a noise vibration is superimposed in a knocking detection period.

FIG. 5(a) shows one example of a knocking signal and the vibration level of a specified frequency with respect to a crank angle when "knocking has not occurred yet as well as a noise source is present". FIG. 5(b) shows one example of a knocking signal and the vibration level of a specified frequency with respect to a crank angle when "knocking has occurred as well as a noise source is present".

Incidentally, FIG. 5(b) shows the case in which a knocking vibration and a noise vibration are generated at different timings.

Figure 6:
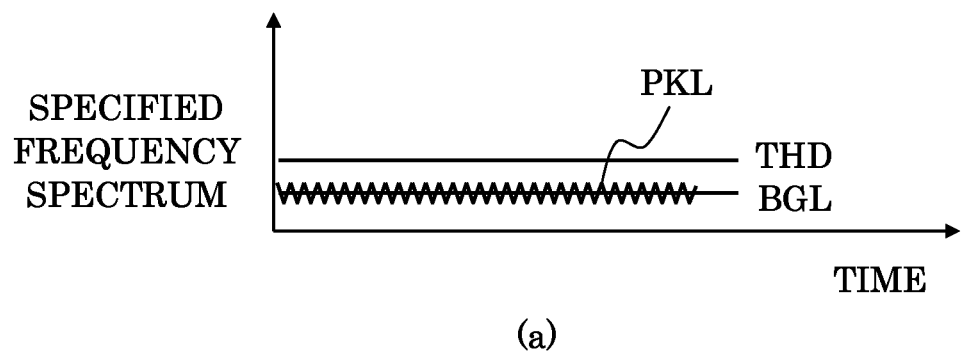
FIG. 6 is timing charts each for explaining a knocking strength to be calculated based on characteristics of FIG. 5.
Figure 6:
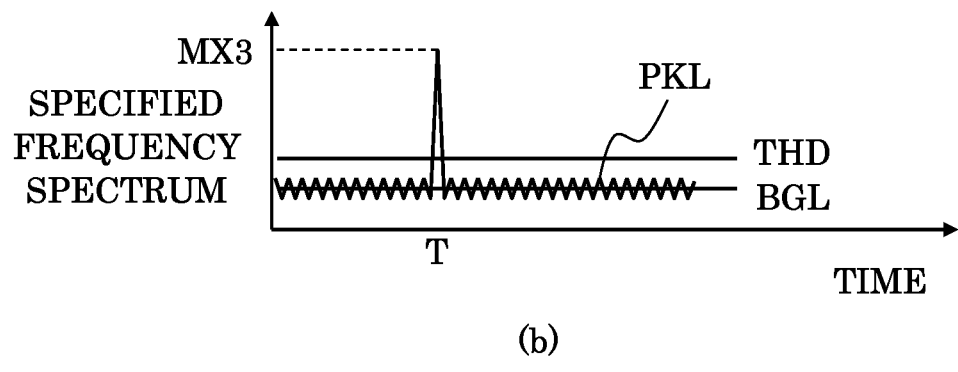

Further, FIG. 6 is timing charts each illustrating the "vibration level (spectrum) of a specified frequency" calculated in accordance with the above-described FIG. 5.

Incidentally, FIG. 6(a) illustrates the "second peak value PKL", a "background level BGL" and a "threshold THD for knocking determination" when "knocking has not occurred yet as well as a noise source is present, and noise removal is performed" as time series data in plural cycle periods. FIG. 6 (b) illustrates the "second peak value PKL", a "background level BGL" and a "threshold THD for knocking determination" when "knocking has occurred as well as a noise source is present, and noise removal is performed" as time series data in plural cycle periods.

In FIG. 5(a) illustrating the case of no occurrence of knocking, since a noise vibration is superimposed in a knocking detection period, as to the spectrum of a specified frequency, the spectrum due to noise vibration (the tenth spectrum from the left in FIG. 5(a)) MX2 is calculated.

Thus, in the first embodiment, in the case that the spectrum MX2 resulted from a noise is the largest, a comparison between the crank angle Spos at which the MX2 takes place and the crank angle Npos at which a noise peak value is estimated to take place is made. Consequently, since Spos and Npos are in coincidence, by the above-described equation (2), a value MX0 that is obtained by subtracting the noise peak value Nmax from the MX2 is employed as the second peak value PKL.

The one that represents the second peak value PKL having been employed in each combustion cycle throughout plural cycle periods is the second peak value PKL illustrated in FIG. 6 (a).

Furthermore, based on this second peak value PKL, by the above-described equation (3), a background level BGL illustrated in FIG. 6 (a) is calculated, and based on the second peak value PKL and the background level BGL, by the above-described equation (4), a threshold THD for knocking determination illustrated in FIG. 6(a) is calculated.

Since the influence of superimposition of a noise is removed from any of the second peak value PKL, the background level BGL and the threshold THD for knocking determination that have been calculated as described above, a noise vibration is avoided from being erroneously determined as knocking.

Incidentally, although in the above description, it is described that a value MX0 obtained by subtracting the noise peak value Nmax from the spectrum resulted from a noise vibration (the tenth spectrum from the left in FIG. 5(a)) is employed as the second peak value PKL, it is preferable that the "spectrum MX2 at the time of a crank angle Npos" stored in a buffer is modified to MX0 and a peak value in a knocking detection period is detected again.

In such a case, the sixth spectrum MX1 from the left in FIG. 5(a) is selected again as the first peak value Smax and the crank angle is updated to a crank angle Spos' that is different from the crank angle Spos at which the first peak value Smax takes place, so that the "first peak value and the crank angle" in the same manner as FIG. 5(a) when no noise is superimposed may be selected.

The above-mentioned descriptions are further supplementarily described hereinafter. Due to occurrence of a noise, although a peak value MX2 (a spectrum in Spos position) is originally detected as the maximum value, the spectrum at Spos position is modified to MX0 (=MX2−Nmax). Further, the maximum value between ATDC 0 [deg] and ATDC 60 [deg] is detected again.

Consequently, MX1 (a spectrum at Spos' position) comes to be a peak value after modification, MX1 (spectrum at Spos' position) is employed as a peak value.

Next, in the case that knocking occurs at a certain time point T, a knocking vibration as is shown in FIG. 5(b) takes place in the knocking signal, and also as to the spectrum of a specified frequency, a large spectrum (the fourth spectrum from the left in FIG. 5(b)) MX3 due to the knocking vibration is calculated and this is selected as the first peak value Smax.

Incidentally, in FIG. 6(b), since a crank angle Spos at which the first peak value Smax takes place and a crank angle Npos at which a noise peak value Nmax is estimated to take place are not in coincidence, by the above-described equation (1), MX3 is employed as the second peak value PKL as it is.

Further, FIG. 6(b), in the same manner as the above-described FIG. 6(a), illustrates the second peak value PKL, a background level BGL and a threshold THD for knocking determination that are shown throughout plural cycle periods, and at the time point at which the second peak value PKL at a time point T of the occurrence of knocking exceeds the threshold THD for knocking determination, knocking is determined to occur and a knocking strength KNK is calculated by the equation (5).

The knocking strength KNK having been calculated as described above is not affected by the superimposition of noise, the value at the same level as FIG. 5(b) in the case that no noise is superimposed is calculated.

Now, supplementary descriptions as to the calculation process of a knocking strength in "another case in which a noise vibration is superimposed in a knocking detection period" are hereinafter made referring to timing charts of FIGS. 7 and 8.

Figure 7:
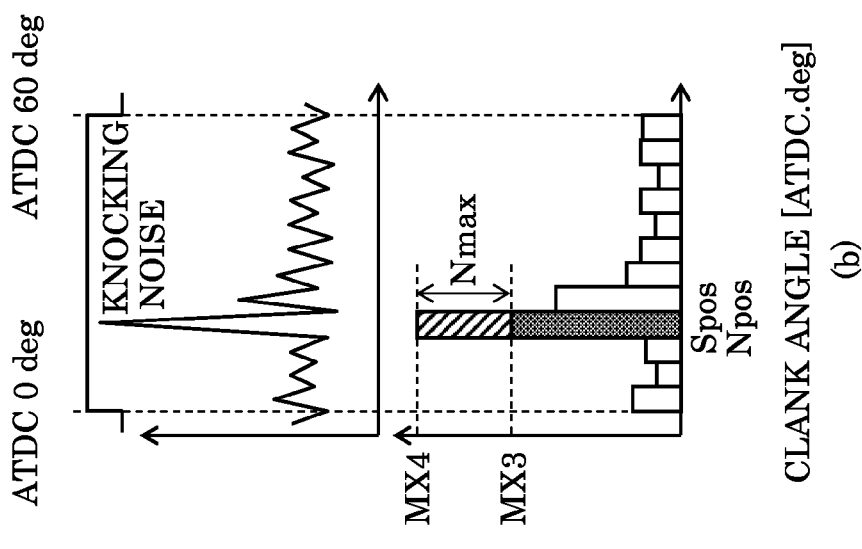
FIG. 7 is timing charts each illustrating a knocking signal and the vibration level of a specified frequency in one combustion cycle (where a noise vibration is superimposed in a knocking detection period as well as a knocking vibration and a noise vibration are overlapped).
Figure 7:
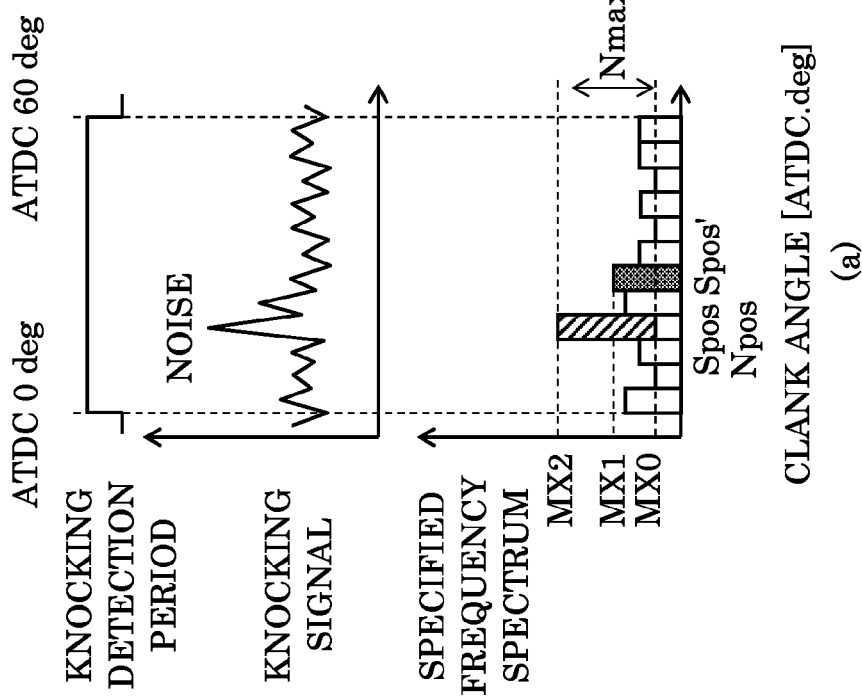

FIG. 7 is timing charts each illustrating a "knocking signal and the vibration level of a specified frequency in one combustion cycle" in the case that a noise vibration is superimposed in a knocking detection period. FIG. 7 (a) shows one example of a knocking signal and the vibration level of a specified frequency with respect to a crank angle when "knocking has not occurred yet as well as a noise source is present". FIG. 7 (b) shows one example of a knocking signal and the vibration level of a specified frequency with respect to a crank angle when "knocking has occurred as well as a noise source is present". Incidentally, FIG. 7(b), being different from the case of the above-described FIG. 5(b), shows a case in which a knocking vibration and a noise vibration take place in the same timing.

Figure 8:
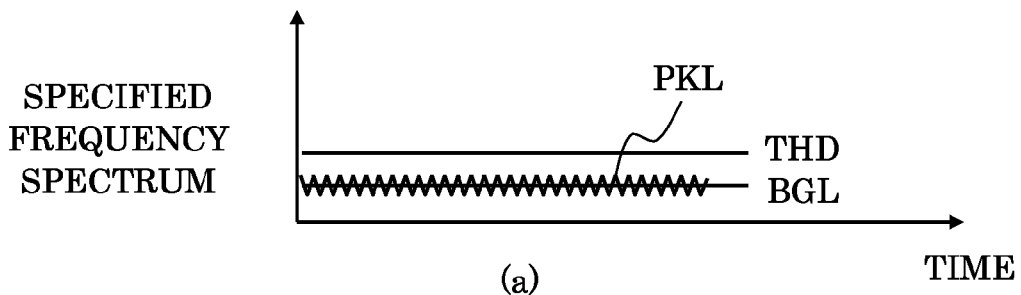
FIG. 8 is timing charts each for explaining a knocking strength to be calculated based on characteristics of FIG. 7.
Figure 8:
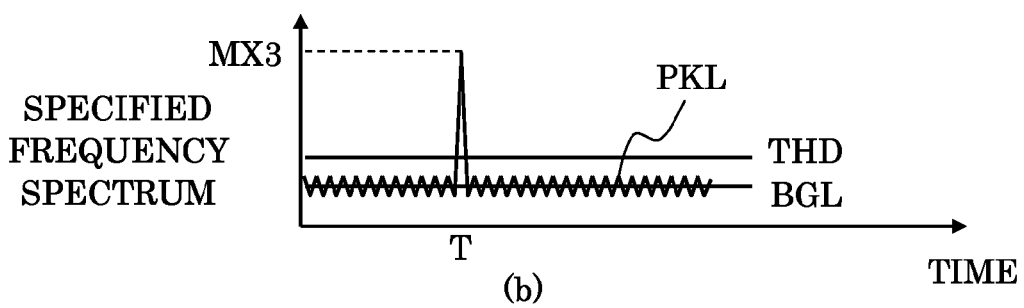

Furthermore, FIG. 8 is timing charts each illustrating the second peak value PKL, a background level BGL and a threshold THD for knocking determination that are calculated in accordance with the above-described FIG. 7 as time series data in plural cycle periods.

Incidentally, FIG. 8(a) shows the case in which "knocking has not occurred yet as well as a noise source present, and noise removal is performed", and FIG. 8(b) shows the case in which "knocking has occurred as well as a noise source is present, and noise removal is performed".

In FIG. 7(a) showing the case of no occurrence of knocking, since a noise vibration is superimposed in a knocking detection period, as to the spectrum of a specified frequency, a spectrum resulted from a noise vibration (the fourth spectrum from the left in FIG. 7(a)) MX2 is calculated.

Thus, in the case that the spectrum MX2 resulted from a noise is the largest, in this embodiment, a comparison between a crank angle Spos at which the MX2 takes place and a crank angle Npos at which a noise peak value is estimated to take place is made. Consequently, since Spos and Npos are in coincidence, by the above-described equation (2), a value MX0 that is obtained by subtracting the noise peak value Nmax from the MX2 is employed as the second peak value PKL.

The one that represents the second peak value PKL having been employed in each combustion cycle throughout plural cycle periods is the second peak value PKL illustrated in FIG. 8 (a). Based on this second peak value PKL, by the above-described equation (3), a background level BGL illustrated in FIG. 8 (a) is calculated, and based on the second peak value PKL and the background level BGL, by the above-described equation (4), a threshold THD for knocking determination illustrated in FIG. 8(a) is calculated.

Since the influence of superimposition of a noise is removed from any of the second peak value PKL, the background level BGL and the threshold THD for knocking determination that have been calculated as described above, a noise vibration is avoided from being erroneously determined as knocking.

Incidentally, although in the above description, it is described that a value MX0 that is obtained by subtracting a noise peak value Nmax from a spectrum (the tenth spectrum from the left in FIG. 7(a)) resulted from a noise vibration is employed as the second peak value PKL, it is preferable that a "spectrum MX2 at the time of a crank angle Npos" that is stored in a buffer is modified to MX0 and a peak value in a knocking detection period is detected again.

In such a case, the sixth spectrum MX1 from the left in FIG. 7(a) is selected again as the first peak value Smax and the crank angle at which the first peak value Smax takes place is updated to a crank angle Spos', so that the first peak value and the crank angle in the same manner as FIG. 5(a) when no noise is superimposed may be selected.

Next, in the case that knocking occurs at a certain time point T, a knocking vibration as is illustrated in FIG. 7(b) takes place in the same timing as a noise vibration. Also as to the spectrum of a specified frequency, a "larger spectrum (the fourth spectrum from the left in FIG. 7(b)) MX4" that is the addition of the knocking vibration to the noise vibration is calculated and this value is selected as the first peak value Smax.

Then, in this embodiment, a comparison between the crank angle Spos when the spectrum MX4 that is too large including the spectrum resulted from this noise vibration takes place and a crank angle Npos at which a noise peak value is estimated to take place is made. As the result, since Spos and Npos are in coincidence, by the equation (2), a value Mx3 that is obtained by subtracting a noise peak value Nmax from the MX4 is employed as the second peak value PKL.

Further, the one that represents the second peak value PKL having been employed in each combustion cycle throughout plural cycle periods is the second peak value PKL illustrated in FIG. 8 (b). Furthermore, based on this second peak value PKL, by the above-described equation (3), a background level BGL illustrated in FIG. 8 (b) is calculated, and based on the second peak value PKL and the background level BGL, by the above-described equation (4), a threshold THD for knocking determination illustrated in FIG. 8(b) is calculated.

The influence of superimposition of noise is removed from any of the second peak value PKL, the background level BGL and the threshold THD for knocking determination that have been calculated as described above.

Accordingly, it is avoided that the occurrence of knocking is erroneously determined with the spectrum of a knocking vibration including a noise vibration and also that a knocking strength is calculated based on the spectrum of a knocking vibration including a noise vibration, whereby a knocking retard amount comes to be inappropriate.

Figure 9:
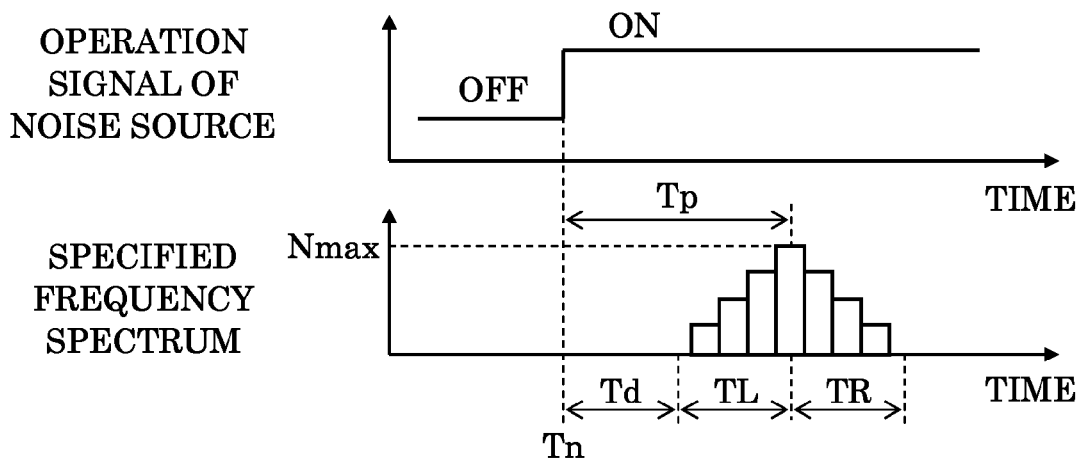
FIG. 9 is a timing chart for explaining the method of estimating the occurrence timing of a noise vibration.

Now, the estimation method of a "crank angle Npos at which a noise peak value Nmax is estimated to take place" using the noise occurrence timing estimation means 104 is described referring to a timing chart illustrated in FIG. 9.

FIG. 9 is a timing chart showing one example of the relation between an operation signal (energization signal of the fuel injection valve 3 in the case of the fuel injection valve 3, and a valve-closing timing in the case of the intake valve 1c or the exhaust valve 1d) of an operating member (the fuel injection valve 3, intake valve 1c, exhaust valve 1d and the like) that may be a noise source and the spectrum of a noise vibration to take place on a specified frequency.

In FIG. 9, when the operation signal of a noise source is switched from OFF to ON at a time point Tn, a noise takes place due to operation of the noise source and the noise vibration thereof takes place on the specified frequency after a delay time period Td has passed from the time point Tn due to its transmission delay.

The spectrum of this noise vibration has such characteristics as to increase over a time period TL, to climax at a peak value after a time period Tp has passed from the time point Tn, and to decrease over a time period TR thereafter.

Thus, the time period Tp from the time point at which the operation signal of a noise source is switched from OFF to ON to the time point at which a noise peak value Nmax takes place on a specified frequency has preliminarily been measured experimentally and is stored in the memory of the ECU 6.

Further, based on the current rotation speed to be detected by the crank angle sensor 9, Tp (that is a time period from the time point at which the operation signal of a noise source is switched from OFF to ON to the time point at which a noise peak value Nmax takes place on a specified frequency) is converted from in units of time to in units of angle, thereby calculating an angle-base value Tp. Whereby, the crank angle from the time point at which a noise source operates to the time point at which a noise peak value Nmax takes place is estimated.

Incidentally, as the operation signal of a noise source, a control value to be operated by the ECU 6 or the value based on a detected value by a variety of sensors to be inputted to the ECU 6 is employed.

In the case that the spectrum of a noise vibration to take place on a specified frequency has such characteristic as illustrated in FIG. 9, by multiplying a noise peak value Nmax by a noise level correction coefficient Kn that is set based on a difference (=Spos−Npos) between a crank angle Spos at which the first peak value Smax takes place and a crank angle Npos at which a noise peak value Nmax is estimated to take place, even when Spos and Npos are not completely in coincidence, a noise vibration level can be properly removed.

Figure 10:
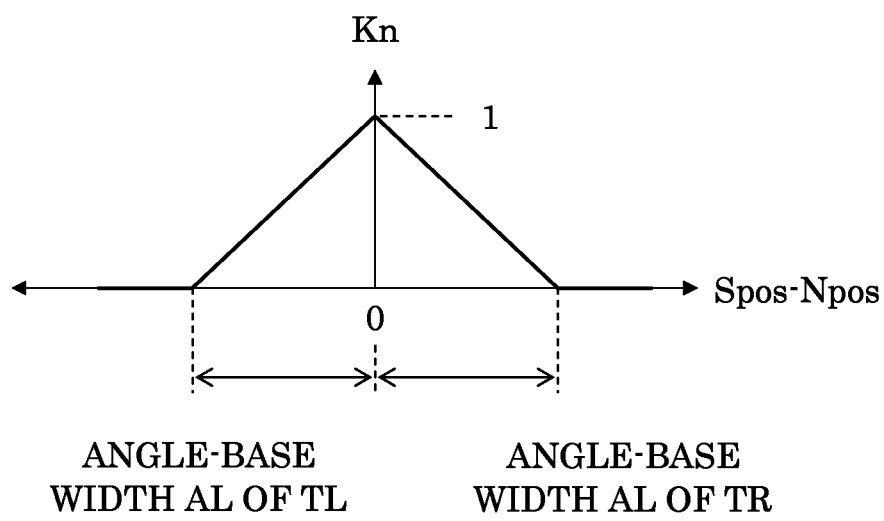
FIG. 10 is a diagram for explaining the calculation method of a noise level correction factor.

FIG. 10 is a diagram for explaining the calculation method of a noise level correction coefficient.

As is illustrated in FIG. 10, for example, Nmax is multiplied by Kn (=1) when "Spos−Npos" is zero, Nmax is multiplied by Kn (=0) when "Spos−Npos" is not less than an angle-base width AR of a time width TR of FIG. 9, and Nmax is multiplied by Kn (=0) when "Spos−Npos" is not more than an angle-base width AL of a time width TL of FIG. 9.

Whereby, even in the case that the peak value of a vibration due to occurrence of knocking and the peak value of a noise vibration are not overlapped completely in the same timing, the vibration level resulted from a noise is properly removed.

Now, operations of the knocking suppression function according to the first embodiment are described referring to flowcharts.

Figure 11:
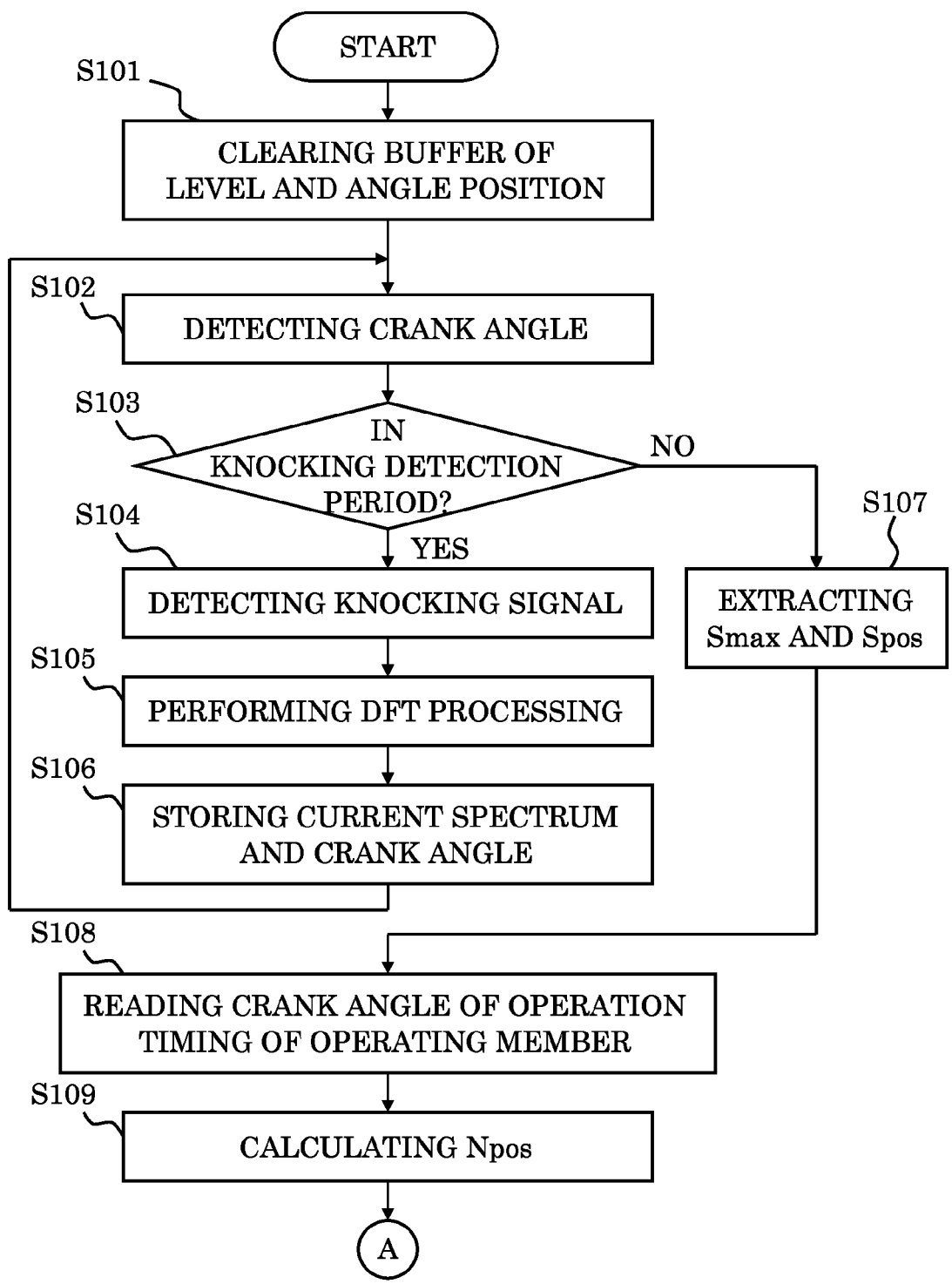
FIG. 11 is a flowchart illustrating the first half of a processing operation in a control unit of the internal combustion engine according to the first embodiment.

FIG. 11 is a flowchart illustrating the first half of the operation of knocking suppression function in the control unit of an internal combustion engine according to this embodiment.

Figure 12:
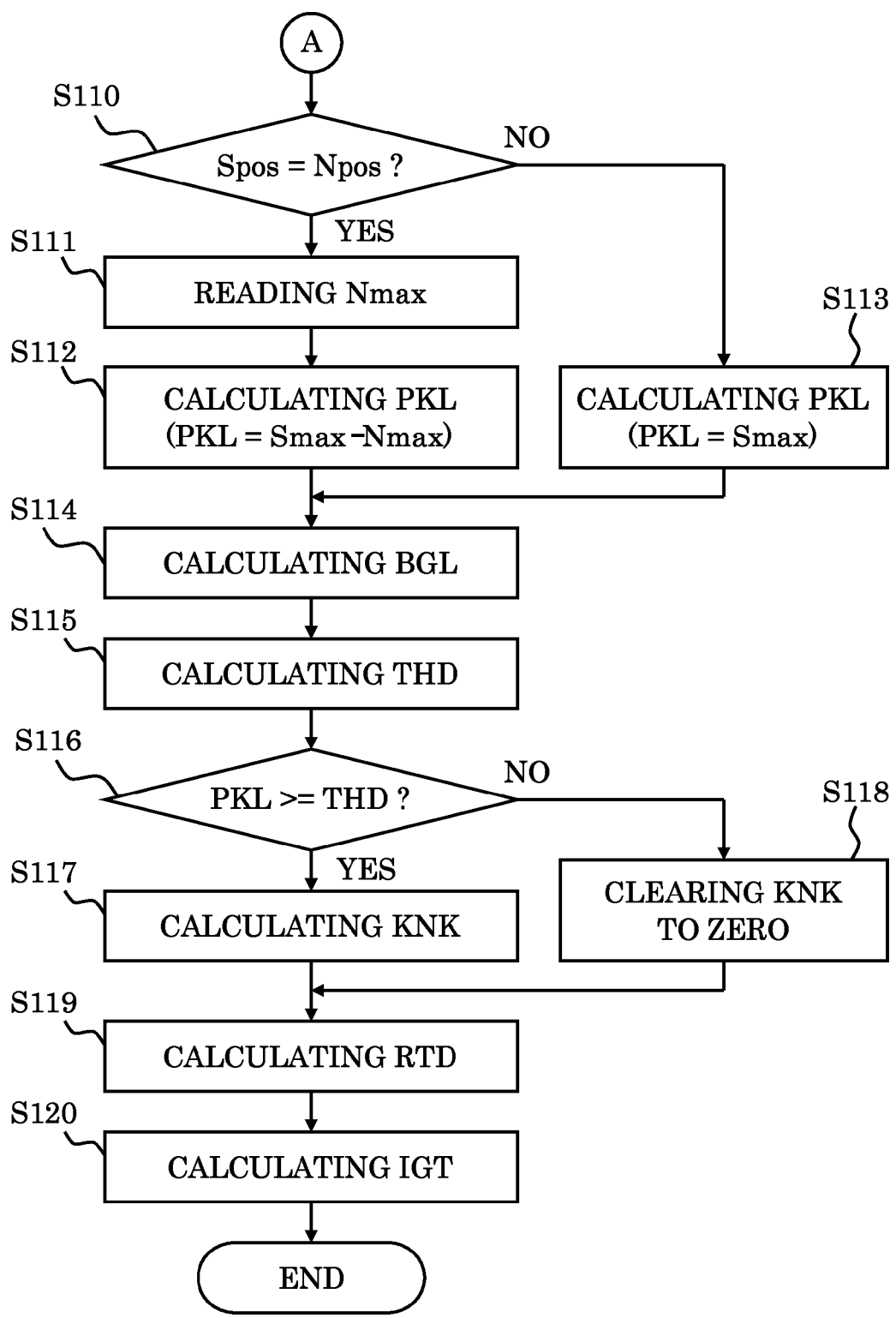
FIG. 12 is a flowchart illustrating the second half of the processing operation in the control unit of the internal combustion engine according to the first embodiment.

Further, FIG. 12 is a flowchart illustrating the second half of the operation of knocking suppression function in the control unit of an internal combustion engine according to this embodiment.

Incidentally, descriptions are hereinafter made on the assumption that the processing of flowcharts illustrated in FIGS. 11 and 12 is started when a crank angle that is detected by the crank angle sensor 9 is determined to change from outside a knocking detection period to inside the knocking detection period.

Now, in Step S101 to be performed first after a crank angle is determined to change from outside a knocking detection period to inside a knocking detection period, a buffer (storage region) for storing in sequence the spectrum of a specified frequency component and the crank angle at which this spectrum is detected is cleared, and thereafter the processing goes to Step S102.

In Step S102, a crank angle having been detected by the crank angle sensor 9 is read.

In the subsequent Step S103, based on the crank angle, the determination as to whether or not it is in a knocking detection period.

In this example, YES is determined since it is just after the crank angle has changed from outside the knocking detection period to inside the knocking detection period, the processing goes from Step S103 to Step S104, Step S105 and Step S106.

In Step S104, the A/D converted value of the knocking signal having been detected by the knocking sensor 11 is read.

In the subsequent Step S105, DFT processing by the specified frequency extracting means 100 is performed and the spectrum of a specified frequency component is extracted, and the processing goes to Step S106.

In Step S106, by the peak signal extracting means 101, the spectrum of the specified frequency component having been extracted in Step S105 and the crank angle having been detected in Step S102 are stored in the buffer, and the processing returns to Step S102.

When the processing returns to Step S102 from Step S106, a crank angle is read again in Step S102. Thereafter, until the determination in Step S103 comes to be NO, that is until a crank angle comes to be outside the knocking detection period, the processing of Step 104, Step S105, Step S106 and Step S102 in a predetermined cycle period is repeated.

Furthermore, when a time period has passed and the crank angle having been read in Step S102 is moved from inside the knocking detection period to outside the knocking detection period, the determination in Step S103 comes to be NO and the processing goes from Step S103 to Step S107.

Besides, in Step S107, the first peak value Smax, being the maximum value of spectrums of the specified frequency component in the knocking detection period and the crank angle Spos at which the first peak value Smax is detected that are stored in the buffer are extracted, and the processing goes to Step S108.

In Step S108, the crank angle corresponding to the operation timing of an operating member that may be a noise source is read.

In the subsequent Step S109, a crank angle Npos at which the noise peak value Nmax is estimated to take place is calculated from the "operation timing of the operating member" and a "delay time period Tp having preliminarily been set in consideration of the transmission delay from this operation timing until the maximum value resulted from the noise vibration actually takes place as the vibration spectrum of the specified frequency", and the processing proceeds to Step S110.

Incidentally, the processing in Step S108 and Step S109 are performed by the noise occurrence timing estimation means 104.

Then, in Step S110, it is determined whether or not the crank angle Spos at which the first peak value Smax takes place and the crank angle Npos at which the noise peak value Nmax is estimated to take place are identical.

Here, in the case of Spos≠Npos, NO is determined, the processing goes from Step S110 to Step S113, and by the above-described equation (1), the second peak value PKL=Smax is calculated and the processing goes to Step S114.

On the contrary, in the case of Spos=Npos, YES is determined, the processing goes from Step S110 to Step S111, and the noise peak value Nmax that is stored in noise level storage means 103 is read.

Subsequently, in Step S112, by the above-described equation (2), the second peak value PKL=Smax−Nmax is calculated and the processing goes to Step S114.

Incidentally, the processing from Step S110 to Step S113 is performed by the noise removing means 102.

In addition, although in Step S110, the determination is made depending on whether or not Spos and Npos are completely identical, it is preferable that in consideration of the dispersion or the estimation precision of the crank angle Npos at which the noise peak value Nmax is estimated to take place, in the same manner as the equation (9), the condition on which YES is determined includes a predetermined width VAR.

$$(Npos-VAR) \le Spos \le (Npos+VAR) \quad \text{equation (9)}$$

In the subsequent Step S114, a background level BGL is calculated by the BGL calculation means 105, in Step S115, a threshold THD for knocking determination is calculated by the threshold calculation means 106, and the processing goes to Step S116.

Furthermore, in Step S116, by the comparison between the second peak value PKL and threshold THD for knocking determination, the presence or absence of the occurrence of knocking is determined.

Here, in the case of PKL≥THD, the occurrence of knocking is determined (YES is determined) and the processing goes to Step S117, in which by the above-described equation (5), a knocking strength KNK is calculated, and the processing goes to Step S119. On the contrary, in the case of PKL<THD, no occurrence of knocking is determined (NO is determined) and the knocking strength KNK is set to zero by the above-described equation (6), and the processing goes to Step S119.

Incidentally, in Step S116, the processing is made by the knocking determination means 107, and in Step S117 and Step S118, the processing is made by the knocking strength calculation means 109.

Moreover, in Step S119, by the equation (7), a knocking retard amount RTD in accordance with the knocking strength KNK is calculated. In the final Step S120, by the equation (8), a basic ignition timing IGB having been determined based on the operation state of the engine 1 is changed to the retard side by the knocking retard amount RTD and a final ignition timing IGT is determined, and then a series of processing is ended.

Incidentally, in Step S119, the processing is made by the retard amount calculation means 110, and in Step S120, the processing is made by the ignition timing correction means 110.

By the way, in the case that a noise source is a fuel injection valve, there are some cases where a peak value Nmax of the spectrum of a specified frequency due to occurrence of a noise vibration is regarded substantially as a constant value.

Figure 13:
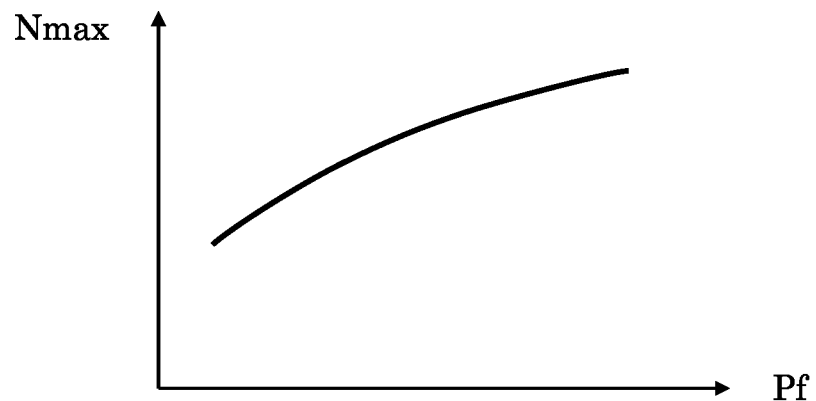
FIG. 13 is a characteristic diagram illustrating a "noise peak value when a fuel injection valve operates" with respect to a "fuel pressure value".

However, in the case that the level change of noise vibration by the operation of valve-opening or valve-closing of a fuel injection valve when a fuel pressure Pf to be injected from the fuel injection valve is changed becomes an amount of change that cannot be ignored, for example, such characteristics as shown in FIG. 13 (that is, the value of a noise peak value Nmax with respect to a fuel pressure Pf) has preliminarily been measured experimentally and stored in the ECU 6. Whereby, a proper value of Nmax in accordance with the fuel pressure Pf can be employed, and irrespective of the change of the fuel pressure Pf, the vibration level of noise due to operation of the fuel injection valve can be removed with high precision.

Figure 14:
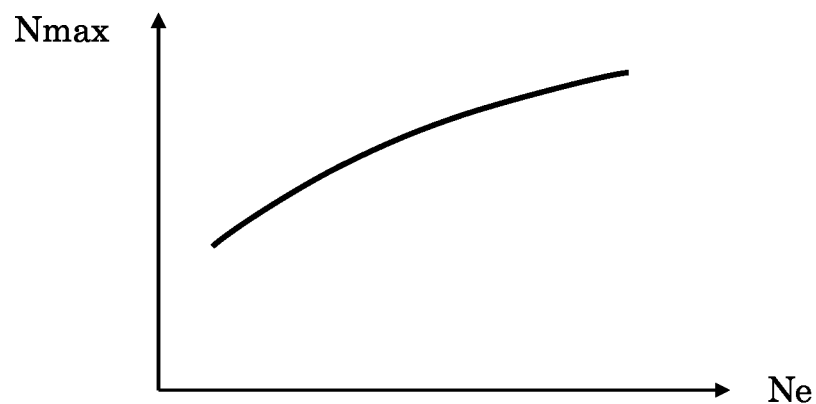
FIG. 14 is a characteristic diagram illustrating a "noise peak value when an intake valve or an exhaust valve operates" with respect to a "rotation speed of the internal combustion engine".

Besides, in the case that a noise source is an intake valve or exhaust valve, there are some cases where the peak value Nmax of the spectrum of a specified frequency due to occurrence of a noise vibration is regarded substantially as a constant value. However, in the case that the level change of noise vibration by the operation of valve-closing of an intake valve or an exhaust valve when the rotation speed Ne of the internal combustion engine is changed becomes the amount of change that cannot be ignored, for example, such characteristics as shown in FIG. 14 (that is, the value of the noise peak value Nmax with respect to the rotation speed Ne) has preliminarily been measured and stored in the ECU 6. Whereby, a proper value of Nmax in accordance with a rotation speed Ne can be employed, and irrespective of the change of a rotation speed Ne, the vibration level of noise due to operation of the intake valve or exhaust valve can be removed with high precision.

Further, as to the noise peak value Nmax of a noise vibration of a specified frequency to be stored in the noise level storage means 103, a "spectrum only due to occurrence of noise vibration" that is obtained by subtracting a noise level to take place resulted form the combustion of the internal combustion engine has preliminarily been measured and stored.

Whereby, even in the case that due to change of an operation state or a combustion state, BGL, that is, a vibration level resulted from a normal combustion differs depending on the operation state, the vibration level due to noise can be appropriately removed and an exact BGL can be calculated at all times.

As described above, a control unit of an internal combustion engine according to this embodiment is provided with: a knocking sensor 11 detecting a vibration waveform of an internal combustion engine 1; a crank angle sensor 9 detecting a crank angle of the internal combustion engine 1; specified frequency extracting means 100 extracting a vibration level of a specified frequency from a vibration waveform of the internal combustion engine 1, and peak signal extracting means 101 extracting a first peak value, being the maximum value of the vibration level of the mentioned specified frequency in a predetermined crank angle range, and a crank angle at which the first peak value takes place; noise level storage means 103 in which stored is a vibration level of a noise to take place on the mentioned specified frequency due to operation of an electric or mechanical operating member that is provided in the internal combustion engine 1; noise occurrence timing estimation means 104 estimating a crank angle at which a noise peak value, being a peak value of the noise vibration, takes place, based on a timing of driving the operating member; noise removing means 102 calculating a second peak value based on the first peak value in the case that a crank angle at which the mentioned first peak value takes place and a crank angle at which the mentioned noise peak value is estimated to take place are not in coincidence, and calculating the second peak value based on the first peak value and the noise peak value in the case that a crank angle at which the first peak value takes place and a crank angle at which the noise peak value is estimated to take place are identical; BGL calculation means 105 calculating a background level (BGL), being the average of the second peak value; threshold calculation means 106 calculating a threshold for knocking determination based on the second peak value and the mentioned background level; knocking determination means 107 determining the presence or absence of the occurrence of a knocking based on the second peak value and the threshold for knocking determination; knocking strength calculation means 108 calculating a knocking strength based on the second peak value, the threshold for knocking determination and the background level when the occurrence of a knocking is determined by the knocking determination means 107; retard amount calculation means 109 calculating a knocking retard amount of an ignition timing based on the knocking strength having been calculated by the knocking strength calculation means 108; and ignition timing correction means 110 correcting an ignition timing based on the knocking retard amount having been calculated by the retard amount calculation means 109.

According to the above arrangement, even in the case that a peak value of vibration to take place due to occurrence of knocking and a peak value of noise vibration are overlapped in the same timing, the vibration level due to the occurrence of noise can be properly removed to determine the presence or absence of the occurrence of knocking with high precision as well as an appropriate knocking strength can be calculated at all times.

Further, in the control unit of an internal combustion engine according to this embodiment, the noise removing means 102 calculates a noise level correction coefficient for correcting the noise peak value based on the difference between the crank angle at which the first peak value takes place and the crank angle at which the noise peak value is estimated to take place, and calculates the second peak value based on the first peak value, the noise peak value and the noise level correction coefficient.

According to this arrangement, even in the case that the peak value of a vibration to take place due to occurrence of knocking and the peak value of a noise vibration are not overlapped completely in the same timing, the vibration level due to the occurrence of noise can be properly removed to determine the presence or absence of the occurrence of knocking with high precision as well as an appropriate knocking strength can be calculated at all times.

Furthermore, in the control unit of an internal combustion engine according to this embodiment, in the case that the operating member is a fuel injection valve, the noise level storage means 103 corrects a vibration level of noise having preliminarily been stored in accordance with a pressure value of a fuel to be injected and supplied to the internal combustion engine 1 from the fuel injection valve 3.

According to this arrangement, even in the case that the vibration level of a noise to take place at the time of operation of the fuel injection valve is changed with the pressure value of a fuel, the vibration level of noise can be corrected to a proper level, so that irrespective of the change of the pressure value of fuel, the vibration level of noise due to the operation of fuel injection valve can be calculated with high precision.

Besides, in the control unit of an internal combustion engine according to this embodiment, in the case that the operating member is an intake valve or an exhaust valve, the noise level storage means 103 corrects a vibration level of noise having preliminarily been stored in accordance with the rotation speed or load of the internal combustion engine 1.

According to this arrangement, even in the case that the vibration level of a noise to take place at the time of the operation of an intake valve or an exhaust valve is changed with the rotation speed of an internal combustion engine, the vibration level of a noise can be corrected to a proper level, so that irrespective of the rotation speed of the internal combustion engine, the vibration level of noise due to the operation of the intake valve or exhaust valve can be calculated with high precision.

Further, in the control unit of an internal combustion engine according to this embodiment, the noise level storage means 103 stores a vibration level of noise at the time when there is no vibration level to take place resulted from combustion in the cylinder of the internal combustion engine 1.

According to this arrangement, the vibration level due to occurrence of a noise can be properly removed also with respect to the calculation value of a background level at the time of no occurrence of knocking, and thus an accurate background level can be calculated at all times.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A control unit of an internal combustion engine comprising:
   a knocking sensor detecting a vibration waveform of an internal combustion engine;
   a crank angle sensor detecting a crank angle of said internal combustion engine;
   specified frequency extracting means extracting a vibration level of a specified frequency from a vibration waveform of said internal combustion engine;
   peak signal extracting means extracting a first peak value, being the maximum value of the vibration level of said specified frequency in a predetermined crank angle range, and a crank angle at which said first peak value takes place;
   noise level storage means in which stored is a vibration level of a noise to take place on said specified frequency due to operation of an electric or mechanical operating member that is provided in said internal combustion engine;
   noise occurrence timing estimation means estimating a crank angle at which a noise peak value, being a peak value of said noise vibration, takes place, based on an operation timing of said operating member;
   noise removing means calculating a second peak value based on said first peak value in the case that a crank angle at which said first peak value takes place and a crank angle at which said noise peak value is estimated to take place are not in coincidence, and calculating the second peak value based on said first peak value and said noise peak value in the case that a crank angle at which said first peak value takes place and a crank angle at which said noise peak value is estimated to take place are identical;
   BGL calculation means calculating a background level (BGL), being the average of said second peak value;
   threshold calculation means calculating a threshold for knocking determination based on said second peak value and said background level;
   knocking determination means determining the presence or absence of the occurrence of a knocking based on said second peak value and said threshold for knocking determination;
   knocking strength calculation means calculating a knocking strength based on said second peak value, said threshold for knocking determination and said background level when the occurrence of a knocking is determined by said knocking determination means;
   retard amount calculation means calculating a knocking retard amount of an ignition timing based on a knocking strength having been calculated by said knocking strength calculation means; and
   ignition timing correction means correcting an ignition timing based on the knocking retard amount having been calculated by said retard amount calculation means.

2. The control unit of an internal combustion engine according to claim 1, wherein said noise removing means calculates a noise level correction coefficient for correcting said noise peak value based on a difference between a crank angle at which said first peak value takes place and a crank angle at which said noise peak value is estimated to take place, and calculates the second peak value based on said first peak value, said noise peak value and said noise level correction coefficient.

3. The control unit of an internal combustion engine according to claim 2, wherein in the case that said operating member is a fuel injection valve, said noise level storage means corrects a vibration level of a noise having preliminarily been stored in accordance with a pressure value of a fuel to be injected and supplied to the internal combustion engine from said fuel injection valve.

4. The control unit of an internal combustion engine according to claim 3, wherein said noise level storage means stores a vibration level of a noise when there is no vibration level to take place resulted from combustion in a cylinder of the internal combustion engine.

5. The control unit of an internal combustion engine according to claim 2, wherein in the case that said operating member is an intake valve or an exhaust valve, said noise level storage means corrects a vibration level of a noise having preliminarily been stored in accordance with a rotation speed or a load of the internal combustion engine.

6. The control unit of an internal combustion engine according to claim 5, wherein said noise level storage means stores a vibration level of a noise when there is no vibration level to take place resulted from combustion in a cylinder of the internal combustion engine.

7. The control unit of an internal combustion engine according to claim 2, wherein said noise level storage means stores a vibration level of a noise when there is no vibration level to take place resulted from combustion in a cylinder of the internal combustion engine.

8. The control unit of an internal combustion engine according to claim 1, wherein in the case that said operating member is a fuel injection valve, said noise level storage means corrects a vibration level of a noise having preliminarily been stored in accordance with a pressure value of a fuel to be injected and supplied to the internal combustion engine from said fuel injection valve.

9. The control unit of an internal combustion engine according to claim 8, wherein said noise level storage means stores a vibration level of a noise when there is no vibration level to take place resulted from combustion in a cylinder of the internal combustion engine.

10. The control unit of an internal combustion engine according to claim 1, wherein in the case that said operating member is an intake valve or an exhaust valve, said noise level storage means corrects a vibration level of a noise having preliminarily been stored in accordance with a rotation speed or a load of the internal combustion engine.

11. The control unit of an internal combustion engine according to claim 10, wherein said noise level storage means stores a vibration level of a noise when there is no vibration level to take place resulted from combustion in a cylinder of the internal combustion engine.

12. The control unit of an internal combustion engine according to claim 1, wherein said noise level storage means stores a vibration level of a noise when there is no vibration level to take place resulted from combustion in a cylinder of the internal combustion engine.

* * * * *